US 6,574,535 B1

(12) United States Patent
Morris et al.

(10) Patent No.: US 6,574,535 B1
(45) Date of Patent: Jun. 3, 2003

(54) APPARATUS AND METHOD FOR ACTIVE DRIVELINE DAMPING WITH CLUNK CONTROL

(75) Inventors: Robert L. Morris, Milford, MI (US); Kevin S. Kidston, New Hudson, MI (US); Richard C. Peterson, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/769,176

(22) Filed: Jan. 25, 2001

Related U.S. Application Data

(60) Provisional application No. 60/208,360, filed on May 31, 2000.

(51) Int. Cl.[7] .......................... B60K 41/02; B60K 1/00
(52) U.S. Cl. ........................ 701/22; 477/3; 477/5; 477/15; 477/18; 477/108; 477/110; 180/65.1; 180/65.2; 180/65.6; 180/69.6; 318/34; 318/139; 701/51; 701/54
(58) Field of Search ........................ 701/22, 51, 54; 477/3, 5, 2, 15, 7, 18, 108, 110; 180/65.7, 65.2, 65.1, 65.6, 69.6; 318/34, 139, 376

(56) References Cited

U.S. PATENT DOCUMENTS

| 5,251,503 | A |   | 10/1993 | Morris et al. ............ 74/337.5 |
| 5,669,354 | A |   | 9/1997  | Morris ..................... 123/419 |
| 5,730,094 | A |   | 3/1998  | Morris ................... 123/192.1 |
| 5,803,046 | A |   | 9/1998  | Bolander et al. ......... 123/425 |
| 5,833,022 | A | * | 11/1998 | Welke ...................... 180/65.2 |
| 5,873,426 | A | * | 2/1999  | Tabata et al. ............ 180/65.7 |
| 5,993,350 | A | * | 11/1999 | Lawrie et al. ................ 477/5 |
| 6,083,138 | A | * | 7/2000  | Aoyama et al. .............. 477/5 |
| 6,199,004 | B1 | * | 3/2001  | Russell et al. ............. 701/54 |
| 6,266,597 | B1 | * | 7/2001  | Russell et al. ............. 701/54 |
| 6,319,168 | B1 |   | 11/2001 | Morris et al. ................ 477/5 |

* cited by examiner

Primary Examiner—Thomas G. Black
Assistant Examiner—Tuan C. To
(74) Attorney, Agent, or Firm—Anthony Luke Simon

(57) ABSTRACT

A propulsion system designed for hybrid vehicles utilizing a first torque path from a coupled motor generator system and internal combustion engine through and automatically shifted manual transmission having a secondary torque path from a secondary torque source to the wheels. The system incorporates the high-efficiency of a manual transmission with the smoothness of the most advanced automatic transmissions by utilizing a second torque path to maintain driver requested torque during shifts and braking requests.

22 Claims, 14 Drawing Sheets

WHEEL SPEED BASED DAMPING COMPENSATION

MGS RPM BASED DAMPING COMPENSATION

Control Axle Torque

APPARATUS AND METHOD FOR ACTIVE DRIVELINE DAMPING WITH CLUNK CONTROL

CROSS REFERENCE TO RELATED APPLICATIONS

This application claims the benefit of U.S. Provisional Patent Application, Serial No. 60/208,360, filed on May 31, 2000, the contents of which are incorporated herein by reference thereto.

This application is related to U.S. patent application Ser. No. 09/557,166, filed on Apr. 25, 2000, now U.S. Pat. No. 6,319,168 the contents of which are incorporated herein by reference thereto.

TECHNICAL FIELD

The present invention is related to a method and apparatus for damping the oscillations of the driveline in a hybrid vehicle.

BACKGROUND OF THE INVENTION

Passenger comfort and fuel efficiency have set forth increasing demands on automotive vehicle designs. It is a primary goal of most vehicle designs to provide a more efficient vehicle without having to sacrifice passenger comfort and satisfaction.

Moreover, and as alternative vehicle propulsion systems are implemented, passenger comfort and fuel efficiency are sometimes in opposition to each other. This is particularly true in hybrid vehicle designs.

A Hybrid Vehicle is a vehicle that has at least two sources of energy. A hybrid electric vehicle (HEV) is a vehicle wherein one of the sources of energy is electric and the other source of energy may be derived from a heat engine that burns diesel, gasoline or any other source of chemical energy.

Generally, a hybrid vehicle utilizes more than one type of energy storage. The HEV incorporates both electric energy and chemical energy, and converts the same into mechanical power to propel the vehicle and drive vehicle systems. Numerous ways of coupling the systems may be employed and typically take the form of one or more heat engines and one or more electric drives which are coupled to a transmission to drive one or more of the vehicle's wheels. This includes a significant complexity since the performance, responsiveness and smoothness of these devices is typically quite different. So, while an efficiency gain may be obtained from the system, the complexity of controlling it to provide the smooth response expected by the driver becomes far more difficult.

Given the high priority on efficiency in a hybrid vehicle, the task of coupling the torque sources to the wheels is well-suited to an automated manual transmission, which can be electronically controlled and has one of the highest efficiencies of any transmission device.

The transmission is positioned in the drive train between the heat engine and the driven wheels. The transmission includes a case containing an input shaft, an output shaft, and a plurality of meshing gears. Means are provided for connecting selected ones of the meshing gears between the input shaft and the output shaft to provide a desired speed reduction gear ratio therebetween. The meshing gears contained within the transmission case are of varying size so as to provide a plurality of such gear ratios. By appropriately shifting among these various gear ratios, acceleration and deceleration of the vehicle can be accomplished in a smooth and efficient manner.

However, the drivability of a hybrid vehicle is adversely affected due to the torque oscillations that occur when abrupt torque changes are encountered in the operation of the internal combustion engine and the transmission coupled to it. Such oscillations are encountered during shifting and launching.

For example, an automobile requires higher torque demands at low speeds for acceleration, with a decreasing demand as the cruise speed is approached.

Accordingly, and in order to meet the torque demand of the automobiles acceleration, a transmission having multiple gear ratios must be coupled to an internal combustion engine.

The combination of high driveline efficiencies, which have little damping, and more than one source of torque to be applied to the wheels, creates both problems and opportunities. This is especially apparent during shifts and the initial launching of the vehicle. Unlike an automatic, planetary style transmission, a manual transmission is unable to apply torque to the wheels during a shift, and so by itself it possesses a significant reduction in performance and driver pleasability. A solution in a parallel hybrid vehicle is to utilize a secondary torque source that is not coupled through the transmission, but is either after the transmission on the same axle, or on a different pair of wheels altogether. Therefore, by careful component design and selection, a hybrid system can be optimized for efficiency, as well as performance and smoothness.

In contrast to the torque oscillations of an automated manual transmission, an electric motor or drive train produces higher torques at startup, which decrease as increasing speed is reached.

Accordingly, and since the torque output of an electric motor is similar to demands of the vehicle, there is no requirement for a transmission or drive train used with a high-efficiency internal combustion engine. Therefore, and in order to accommodate the differences between the driving units of a hybrid vehicle, synchronization between the driving force of the two motors or drive trains is necessary.

Additionally, the damping of the torque oscillations of an automated manual transmission will further enhance the drivability and performance of the same.

Accordingly, and in order to provide a highly efficient hybrid vehicle that utilizes a fuel efficient internal combustion engine, the torque oscillations caused by a direct coupled drive train must be minimized.

In addition, hybrid vehicles also utilize a concept known as regenerative braking. Generally, regenerative braking is the conversion of the vehicle's kinetic energy into a source of electrical power. The vehicle's kinetic energy is converted from the spinning wheels, in response to a user request to slow or stop the vehicle. A generator is manipulated, and accordingly, produces electrical energy as it applies a stopping force to the vehicle's axle and/or drive train in response to a stopping request.

Therefore, and in accordance with regenerative braking, the kinetic energy is converted to electric energy as the vehicle begins to slow down.

However, and in situations where the negative torque of the regenerative braking system of a hybrid vehicle is not sufficient enough to meet the driver's braking demand request, the regenerative braking system is supplemented by a conventional friction braking system.

The use of a regenerative braking system will cause a sudden torque reversal in the traction drive system. Accordingly, and since there is a significant amount of backlash in the series of gears and couplings connecting the electric motors to the drive wheels, this torque reversal will cause an annoying disturbance known as "driveline clunk".

Therefore, there is a need for a control approach in a hybrid vehicle wherein the torque of the driveline is controlled so that the dynamics of the aforementioned backlash is accommodated in a smooth fashion, thereby preventing the vehicle's performance from being adversely affected.

SUMMARY OF THE INVENTION

With the importance of driveline efficiencies in today's vehicles and especially with hybrid vehicles, a manual transmission is the best solution for optimizing this efficiency. Unfortunately, a manual transmission with a standard arrangement has many shortcomings. These are mainly that it is slow to shift, has no torque to the wheels during a shift, is often rough when re-engaging the clutch after a shift, wastes part of the kinetic energy stored in engine inertia during a shift, and when automated, requires complex clutch control to attempt to perform shifts smoothly.

When the system is incorporated into a hybrid vehicle, with a secondary drive system connected to it, numerous improvements can be made. Automating the manual transmission and utilizing active speed synchronization and total torque control, allows many of the negative features to be removed. Shifts can be performed quickly without opening the clutch, smooth engagement and disengagement of each gear becomes possible, energy is recovered during upshifts, and synchronization hardware inside transmission can be removed to save cost and weight. Additionally, a hybrid vehicle can be configured such that a secondary means of applying torque to the wheels can be used, so that during a shift of the automated manual on the primary drive train, the torque is made up with the secondary system such that no change in acceleration is noted by the driver. The end result is a drive train that is highly efficient and as smooth as the best automatic transmissions.

These concepts also apply to a standard automated manual transmission connected to a single torque source such as an ICE or single electric drive, though the speed of the system is reduced and the ability to transfer torque to the wheels during a shift is lost. However, a single torque source could be used to perform the synchronization and clutch closed shifting by itself.

BRIEF DESCRIPTION OF THE DRAWINGS

The present invention will now be described, by way of example only, with reference to the accompanying drawings in which.

DETAILED DESCRIPTION OF THE PREFERRED EMBODIMETS

Figure 1:
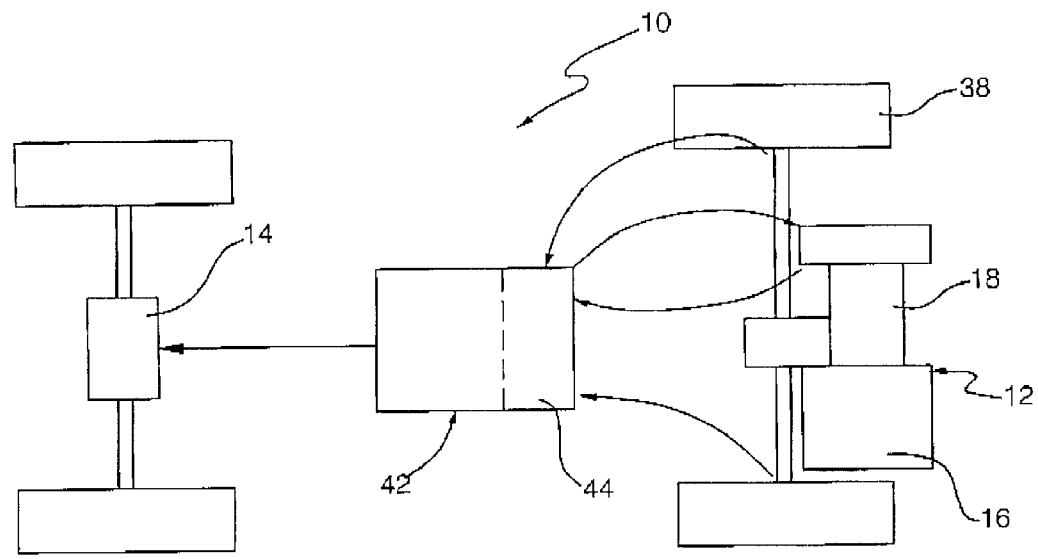
FIG. 1 is a diagram illustrating the hybrid vehicle system configuration of an exemplary embodiment of the instant application.

Referring now to FIG. 1, a hybrid vehicle system configuration contemplated for use with the present invention is illustrated.

A hybrid vehicle 10 is configured to have a rear propulsion system 12 and a front propulsion system 14. Rear propulsion system 12 has an internal combustion engine (hereinafter "ICE") 16 which provides a driving force to an automated manual transmission 18 which converts the driving force of internal combustion engine 16 into the required torque for driving the rear wheels of hybrid vehicle 10.

In the preferred embodiment, front propulsion system 14 is an electric traction drive with a continuous torque output. Alternatively, front propulsion system 14 is a hydraulic or flywheel system or an ICE without any transmission.

In the preferred embodiment, internal combustion engine 16 is a high-efficiency diesel engine. However, and in accordance with the present invention, engine 16 can be any form of heat engine which will produce a controlled amount of torque. In addition, and as an alternative, the ICE and the main propulsion system may be located anywhere within the vehicles, such as in close proximity to the front wheels, along the rear axle, or centrally located within the vehicle.

Figure 2:
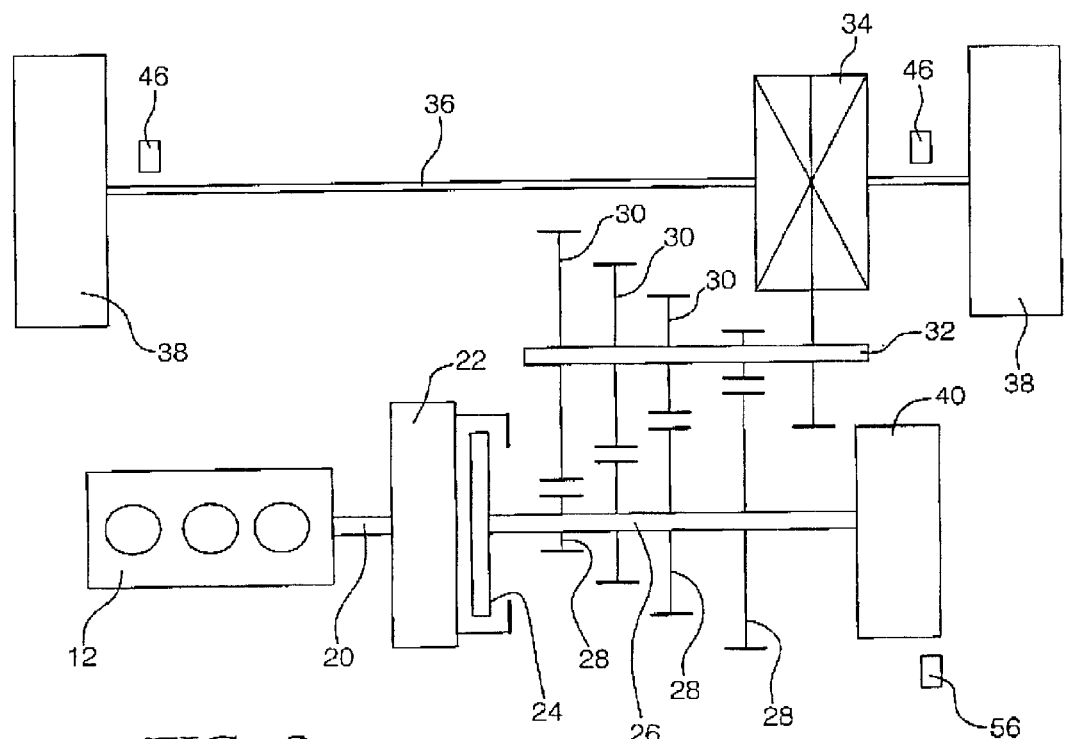
FIG. 2 is a diagram illustrating the rear propulsion system configuration of an exemplary embodiment of the instant application.

Referring now to FIGS. 1 and 2, component parts of rear propulsion system 12 are illustrated. In response to a user or driver's manipulation of an accelerator mechanism (not shown), internal combustion engine 16 provides a rotational force to a driveshaft 20 that is coupled to a flywheel 22. In order to transfer the rotational force from flywheel 22 to automated manual transmission 18, a clutch 24 is positioned to engage and disengage flywheel 22.

Clutch 24 can be a mechanism employing a controllable clutch. Clutch 24 is coupled to an input shaft 26 of automated manual transmission 18. Input shaft 26 is coupled to a plurality of input gears 28. Each one of input gears 28 has a differing diameter and/or gear tooth ratio which provides a differing torque value, which in response to a gearshift command makes contact with a corresponding one of a plurality of output gears 30 which are secured to an output shaft 32 of automated manual transmission 18. Similarly, output gears 30 each have a differing diameter and/or gear tooth ratio.

Output shaft 32 ultimately provides a resulting driving force to a rear differential 34 and a respective axle 36 that provides a rotational force to rear wheels 38 of hybrid vehicle 10.

An electric motor/generator system (hereinafter "MGS") 40 is also coupled to input shaft 26. Motor/generator system 40 is coupled to input shaft 26 at a position remote from clutch 24. Accordingly, and as a rotational force is applied to input shaft 26, motor/generator system 40 can be rotated to provide a source of electrical power for use in hybrid vehicle 10, as well as a rotational driving force to shaft 26.

Alternatively, the motor/generator system can be built into or coupled to the flywheel instead of being directly coupled to the transmission.

In addition, and as an alternative embodiment, the secondary electric motor can be positioned to provide a driving force to the differential or directly to the wheels wherein a plurality of wheel motors may be utilized.

In addition, and since the motor generator is coupled to the input shaft of the transmission, it may be utilized to assist during the transmission shifts.

Moreover, motor generator system 40 can apply torque corrections to directly cancel the torque oscillations of automated manual transmission 18 as it shifts through its gear cycle.

Since both the ICE and MGS are coupled to the input shaft, they are each controlled individually to obtain the desired sum input shaft torque. Since the ICE is slower to respond, and produces higher omissions during changes in torque, it can be primarily supplemented by the MGS to obtain the desired input shaft torque up to the capability of the MGS. This form of control is implemented whenever a gear of the transmission is engaged.

In addition, control is provided to the input shaft. This occurs with the combination of torque commands to the MGS and the ICE. Typically, whichever system is more responsive will be used as the primary controller of speed. This control method will be used anytime the transmission is not in gear and utilized for active synchronization during shifts. Additionally, this is implemented with numerous modes containing different gains and damping of the speed control. This allows for optimum speed control to be used in each instance.

A standard shift goes through the following steps. When a gearshift is commanded, a target torque profile is determined for the input shaft sum torque which will reduce the torque from the current value to below zero. The combined control of the ICE and MGS is used to obtain this profile.

Also during this time, the difference between the driver torque requested and the achieved torque through the transmission is being compensated for by the secondary drive train. In this way, the driver senses no changes to vehicle performance during the shift.

The ICE and MGS act together to change the input shaft speed to the target speed for the new gear. During this period, high gains are used to reach the target speed as fast as possible.

As the MGS and engine reach the target speed and stabilize, a filtered value of the sum torque is measured. This value is a combination of torque errors and the amount of torque required to spin the input shaft at that speed. This value can be used to correct the torque maps, but is primarily used for an offset value and starting torque when engaging the gear. In this way, as the gear is engaged, a true zero torque can be kept on the input shaft and then after the gear is engaged, a new torque profile, starting from the true zero, can be used to ramp up the input shaft torque. This notably increases the smoothness of the shifts.

At the same time, the speed control for the ICE and MGS is changed to a lower gain mode to insure a soft engagement, and the target offset is ramped through zero. After engagement of the next gear, the control of the ICE and MGS switches from speed control to torque control, and as mentioned above, a target input shaft torque profile is determined, which starts from the previously determined torque offset, and ramps back up to the driver requested torque. Accordingly, a fast, repeatable and smooth shift can be performed by utilizing the ability of all three systems, the ICE, the MGS and the automated manual transmission.

This system of shifting obtains the following properties: smoothness is optimized by carefully controlling the torque changes during engagement and disengagement, and by ensuring that a zero torque condition exists at the moments of disengagement and engagement. Shift speed is optimized by combining both ICE torque and MGS torque to actively synchronize to each new gear. Driveline performance is enhanced by the ability to utilize both the MGS and the ICE together for transmitting torque to the wheels.

Launch control using the clutch will be utilized anytime the current gear ratio and wheel speed is such that the input shaft speed is below the engine idle speed or the target engine launch speed. In these cases, the clutch is used to balance the intended engine torque such that the engine speed remains constant. Also, the MGS will offset any variations in clutch torque, allowing a target torque profile based upon the driver's request to be implemented. This means that the engine will attempt to produce the target torque, the clutch will control the engine speed, and thus balance the actual torque being produced by the engine, and the MGS will make any corrections needed to insure that the actual input shaft torque is equal to the target torque profile. Doing so results in smooth transitions of input shaft torque while maintaining the engine at a desired RPM which can be picked for the optimal combination of smoothness, efficiency, and power.

In summation, the process can be generally outlined as follows. A shift sequence is started and the system controller determines the input shaft speed and the required synchronizing speed. The shaft is then unloaded and a new gear is engaged, and the force upon the gearshift is controlled. Throughout the process, the torque is controlled in order to synchronize and control the target speed as well as controlling the force of the shifter. Moreover, the torque is controlled for retries of the shifting process. The new gear is engaged and the shaft is reloaded with a driving torque force. The process is also the same for either an upshift or downshift.

Upon determining the intent of the shift to a different gear, the following occurs. Both rear wheel speeds are measured and averaged to determine the RPM of the differential. Using the intended gear b determine the intended gear ratio multiplied by the current RPM of the differential, yields the target input shaft speed. During this time, the driver requested torque is also continuously calculated based upon the vehicle speed and the position of the accelerator pedal.

At this point, the gearshift sequence detailed earlier is initiated. The hybrid system controller issues the necessary commands to reduce sum torque on the input shaft of the automated manual transmission, and by monitoring the resulting torque at the wheels, the system controller also commands the necessary torque increase to the second propulsion system to maintain a torque value on all four wheels equal to the current request from the driver. The shift process continues through a neutral position, and upon engagement of the targeted gear, the input shaft torque is increased back to the target torque value, while continuing to use the secondary propulsion system to supplement. The result is no loss of sum wheel torque during the shift.

A hybrid system controller 42 provides command inputs to rear propulsion system 12 and front propulsion system 14. In order to provide a damping torque to input shaft 26, the necessary torque correction must be calculated.

A rear propulsion system control 44 provides command inputs to rear propulsion system 12 which will provide torque correction. Rear propulsion system control 44 calculates the necessary correction by executing a computer algorithm that, based on the necessary input information, provides the required torque correction.

Rear propulsion system control 44 receives a revolution per minute RPM input from each rear wheel 38. The RPMs of wheels 38 are calculated by a pair of RPM sensors 46 that are positioned to provide the rpm of each wheel 38 to rear propulsion system control 44. In addition, the RPMs of motor/generator system 40 are also input into the computer algorithm of rear propulsion system control 44.

Accordingly, and as rear propulsion system 12 cycles through a gear shifting sequence wherein a torque drop-off will occur, rear propulsion system control 44 provides a torque command to motor/generator system 40 which will provide the necessary torque correction to input shaft 26.

For example, and when clutch 24 is disengaged from flywheel 22, internal combustion engine 16 is no longer applying a torsional force to input shaft 26. Therefore, and in order to supplement this deficiency, rear propulsion system control 44 executes a command signal which will cause motor/generator system 40 to apply a correction torsional force to input shaft 26.

Conversely, and when clutch 24 is reengaged to flywheel 22, rear propulsion system control 44 executes a command signal that causes motor/generator system 40 to no longer apply a correction torsional force.

Accordingly, motor/generator system 40 supplements the driving force of internal combustion engine 16 which allows hybrid vehicle 10 to utilize a high-efficiency propulsion system which utilizes an internal combustion engine coupled to an automated manual transmission without having to suffer the drivability drawbacks of such a system.

Figure 3:
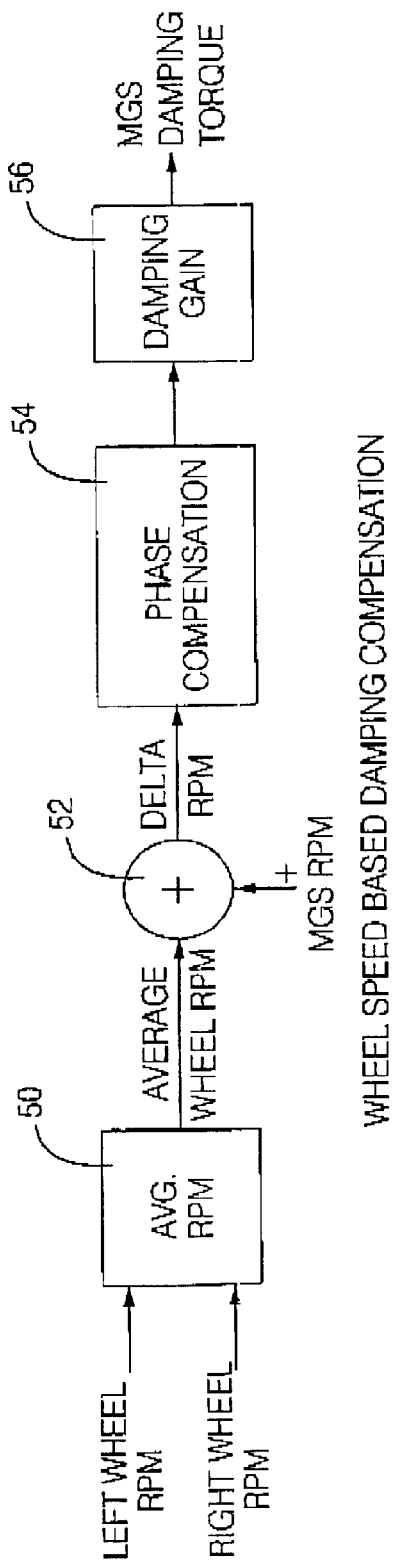
FIG. 3 is a diagram illustrating the calculation process of the damping torque.

Referring now to FIG. 3, a flowchart illustrates the MGS torque corrections which are calculated from wheel speed measurements that are input into a command step 50. Command step 50 determines the average of wheel RPM. A step 52 receives the average wheel RPM in addition to the MGS RPM. Step 52, based upon these inputs, calculates a Delta RPM which is inputted into a phase compensator 54 which provides an input into a step 56. Step 56 determines the damping torque to be applied by motor/generator system 40. Accordingly, motor/generator system 40 manipulates the input shaft to provide a damping compensation.

Figure 4:
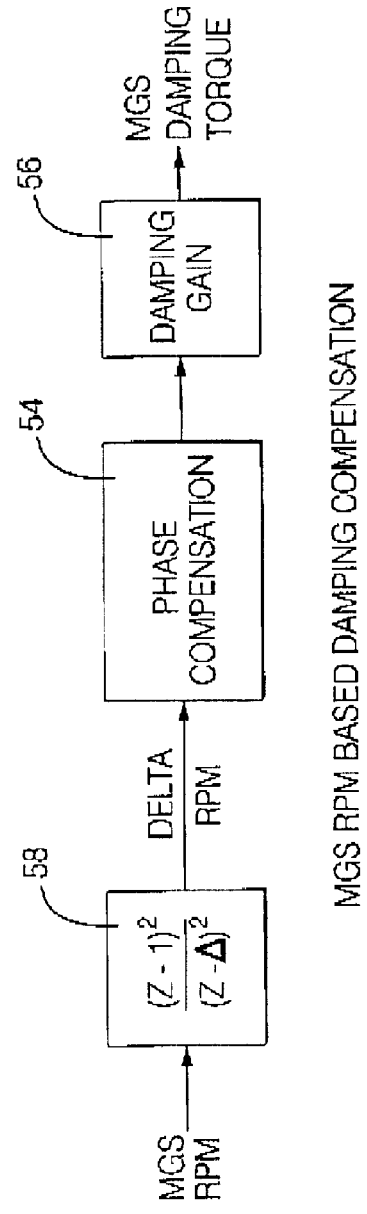
FIG. 4 is a diagram illustrating an alternative calculation process of the damping torque.

As an alternative, and referring now to FIG. 4, a flowchart illustrates the damping compensation based upon the MGS RPM. The MGS RPMs are inputted into a step 58 which determines the Delta RPM utilizing the following formula: $(Z-1)^2/(Z-A)^2$. This formula is referred to as the filtered derivative and is illustrated in FIG. 5.

As illustrated in the FIG. 3 embodiment, the Delta RPM is inputted into a phase compensator 54 and the resulting MGS torque is calculated.

Figure 5:
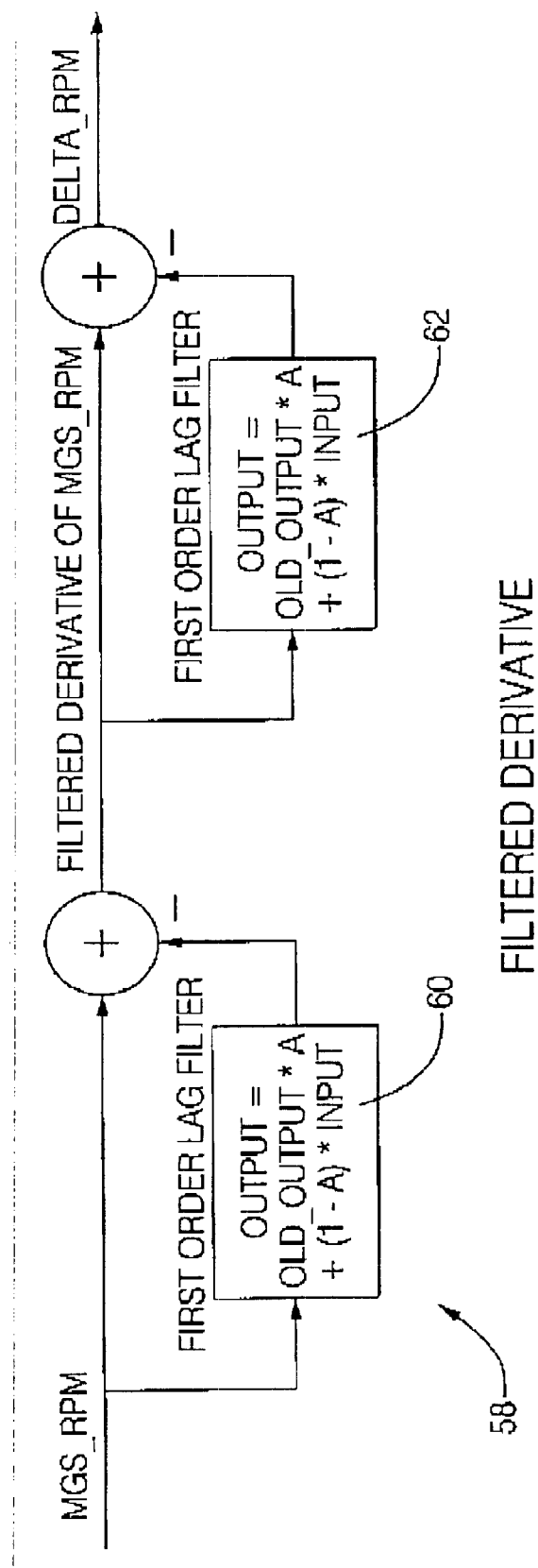
FIG. 5 is a diagram illustrating the calculation of Delta_RPM.

As illustrated in FIG. 5, the delta RPM is calculated by first passing the MGS_RPM signal through a first order lag filter 60 and then subtracting that value from the unprocessed MGS_RPM signal to produce a filtered derivative of the MGS_RPM. The process is then repeated by passing the resulting signal through a second first order lag filter 62 and then subtracting that value from the first filtered derivative of MGS_RPM to produce the Delta_RPM signal. The first half of the calculation determines the deviations from constant or slowly changing levels of MGS_RPM. The second half of the calculation determines the deviations from constant or slowly changing levels of MGS_RPM rate of change. This way Delta_RPM can be determined properly when the vehicle is accelerating.

Figure 6:
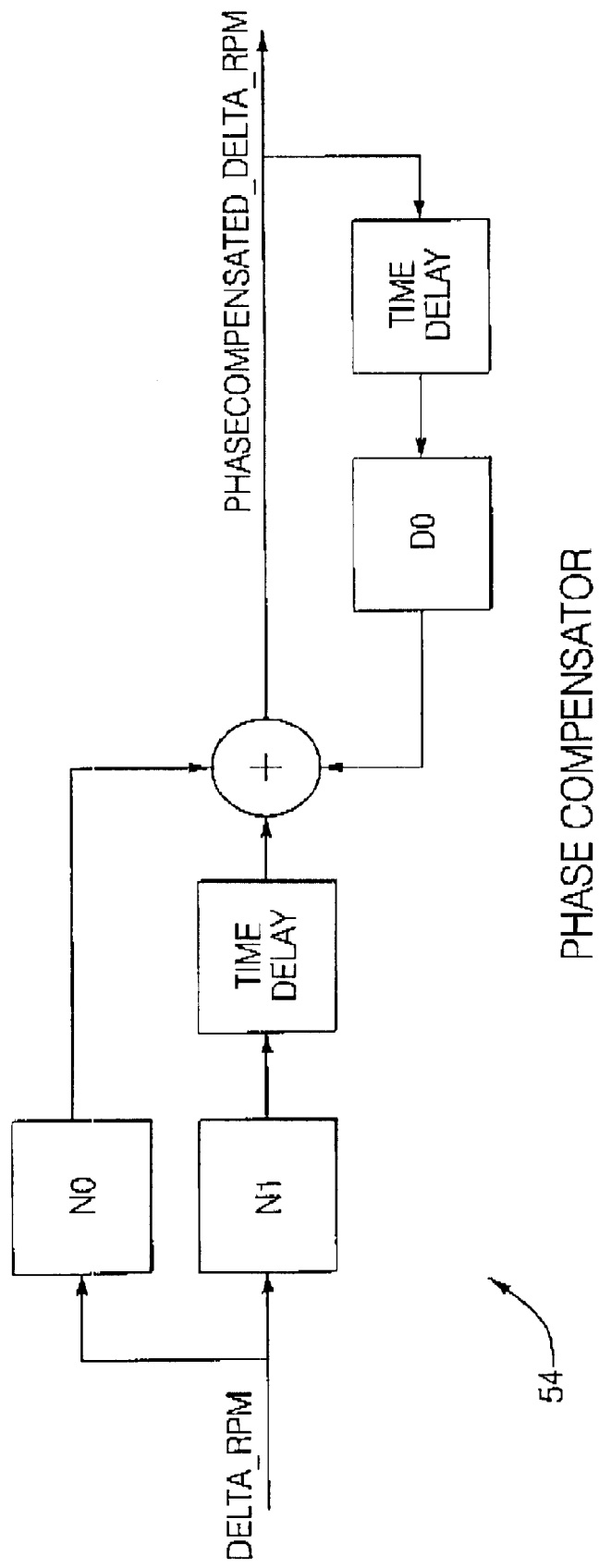
FIG. 6 is a diagram illustrating the calculation of PhaseCompensated_Delta_RPM.

Referring now to FIG. 6, the PhaseCompensated_Delta_RPM is computed as N0*Delta_RPM+N1*old_Delta_RPM+D0*old_PhaseCompensated_Delta_RPM. The coefficients D0, N0 and N1 are designed by first measuring the resonant frequency of the driveline to determine the frequency which needs to be damped. Then the coefficients are chosen so that the phase shift of the compensator is equal and opposite to the phase shift measured between signals given to the MGSDamping_Torque command and the resulting MGS_RPM when the signals are at the resonant frequency.

Figure 7:
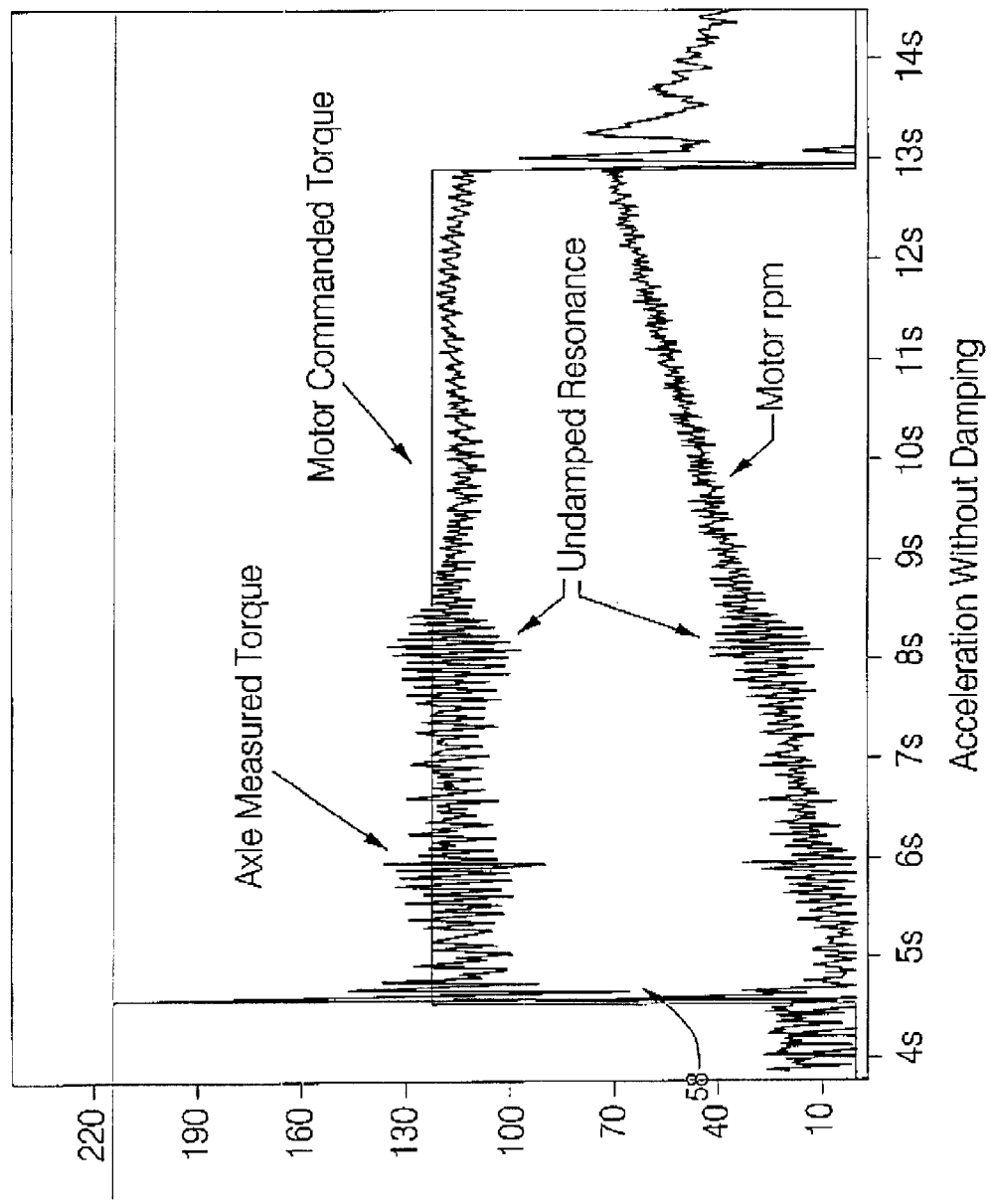
FIG. 7 is a graph illustrating vehicle acceleration without damping.

FIG. 7 illustrates vehicle data showing the measured axle torque, motor rpm and motor commanded torque from the front traction system during an acceleration (without damping) from a stopped condition. As the speed increases, the frequency of the cogging pulses from the electric motor becomes equal to the resonant frequency of the driveline, and the magnitude of the torque variations becomes significant, as shown in FIG. 7.

Figure 8:
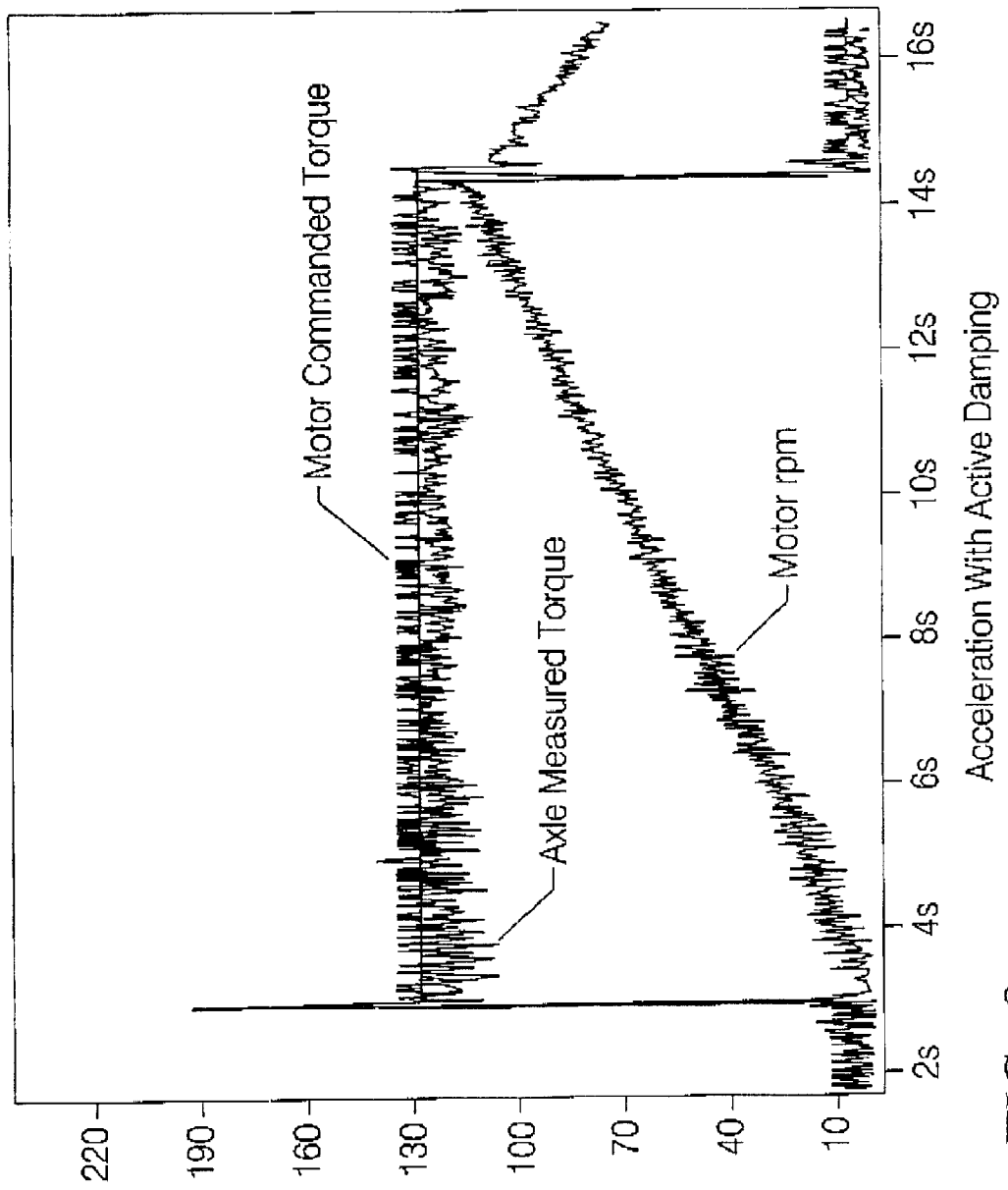
FIG. 8 is a graph illustrating vehicle acceleration with active damping.

FIG. 8 shows the same signals during the same level of acceleration, but with the Active Damping algorithm turned on. The small corrective actions on the Motor Commanded Torque can be seen. As the speed increases the resonance is not excited because the driveline is now damped by the algorithm in accordance with an exemplary embodiment of the present invention.

Referring now in particular to FIGS. 9–17, an alternative embodiment of the present invention is illustrated.

Here the regenerative braking system of the hybrid vehicle, in response to a driver applied stopping request, provides a torque force to the input shaft or the wheels axle. This torque also provides a rotational force to the generator portion of the MGS and accordingly, the generator provides a source of current, which is used to drive the vehicle's components or charge the vehicle's battery system.

In order to maximize the regenerative energy capture, the hybrid vehicle's primary response to a user applied brake pedal input is to apply negative torque with both the front and rear electric drive systems of a parallel hybrid vehicle. The vehicle is also equipped with a friction breaking system that is applied only when the electric motor torques are not large enough to meet the drivers braking demand.

This action will result in a sudden torque reversal in the traction drive system. Since there is a significant amount of backlash in this series of gears and couplings connecting the electric motors to the drive wheels this torque reversal will cause an annoying disturbance known as "driveline clunk". The control approach of the instant application prevents the clunk by controlling the torque in the driveline so that as it approaches the zero point and reverses its direction, it does so in a smooth fashion, which accommodates the dynamics and backlash in the driveline.

Torque is applied to the axle of the hybrid vehicle, the axle acts like a clock spring and will be in a wound up state. As the driver torque request approaches zero the axle will unwind. Accordingly, there will be no torque present on the axle as the vehicle travels through the backlash. Therefore, and when the backlash is taken up, the torque will build in an opposite direction as the axle rewinds in the opposite direction.

The clunk control system of the instant application will be in the unwind state, backlash state or rewind state, depending on the driver torque request and the driveline dynamics.

In the unwind state the amount of axle wind will be continually estimated and the motor torque will be controlled so that the rate of change and axle wind will be zero at the same time the torque is zero. At that point the motor torque is controlled in a slow ramp up to travel through the backlash. Once out of the backlash, the vehicle is now in the rewind state, where the motor torque is controlled in such a way as to not excite the driveline dynamics, which would cause an undesirable effect to the driver.

Figure 9:
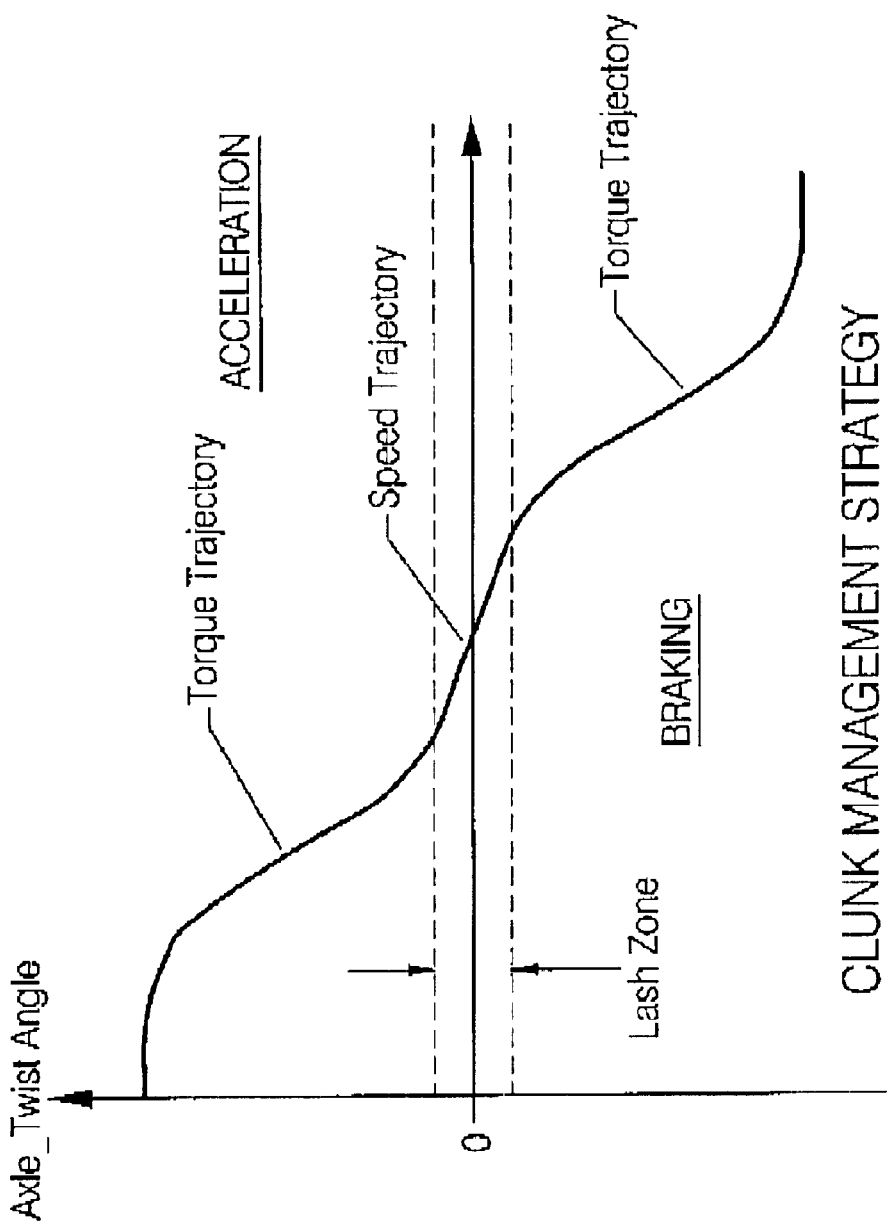
FIG. 9 is a graph illustrating clunk management strategy.

FIG. 9 illustrates a strategy for managing the clunk that occurrs when the torque is suddenly reversed in the driveline by the electric motor or diesel engine or combination of the two. This happens when the driver removes his foot from the accelerator pedal and regenerative braking is used to slow down the vehicle. When the vehicle is accelerating the axle is twisted in the positive direction. When the vehicle is decelerating the axle is twisted in the negative direction. To change from positive twist to negative twist the axle must be unwound and the lash must be taken up in the negative direction. When the axle twist angle is in between positive lash and negative lash it is said to be in the lash zone (illustrated in FIG. 9), and there is no torque transmitted through the driveline. If no clunk management is used the rotating inertia of the motor and engine will accelerate when the axle is unwinding and while the axle twist angle is in the lash zone. A relative speed will develop between the gears and other elements that contribute to the lash in the system, and when the lash is taken up, an impact and oscillation will result. This is known as clunk.

The clunk management strategy disclosed herein is to control the torque on the input shaft of the transmission when the axle twist angle is outside of the lash zone and control the speed of the input shaft when the axle twist angle is inside the lash zone. By controlling the speed inside the lash zone the impact when the lash is taken up can be controlled, and therefore, the clunk can be diminished. The electric motor is used to control the speed of the input shaft at all times. When the axle twist angle is outside of the lash zone the speed trajectory is computed from the desired torque trajectory. The desired twist angle trajectory is first determined from the desired torque trajectory and the axle stiffness. The desired speed trajectory is determined by differentiating the twist angle trajectory, the result is added to the measured output shaft speed and then scaled to account for the gear ratio to determine the desired input shaft speed trajectory. When the axle twist angle is inside of the lash zone a speed target is chosen that will cause the lash to be taken up with little impact. Faster speeds will traverse the lash zone more quickly, but will cause a greater impact. A critical component of the clunk management strategy is the determination of when the angle is inside of the lash zone and when it is outside of the lash zone.

Figure 10:
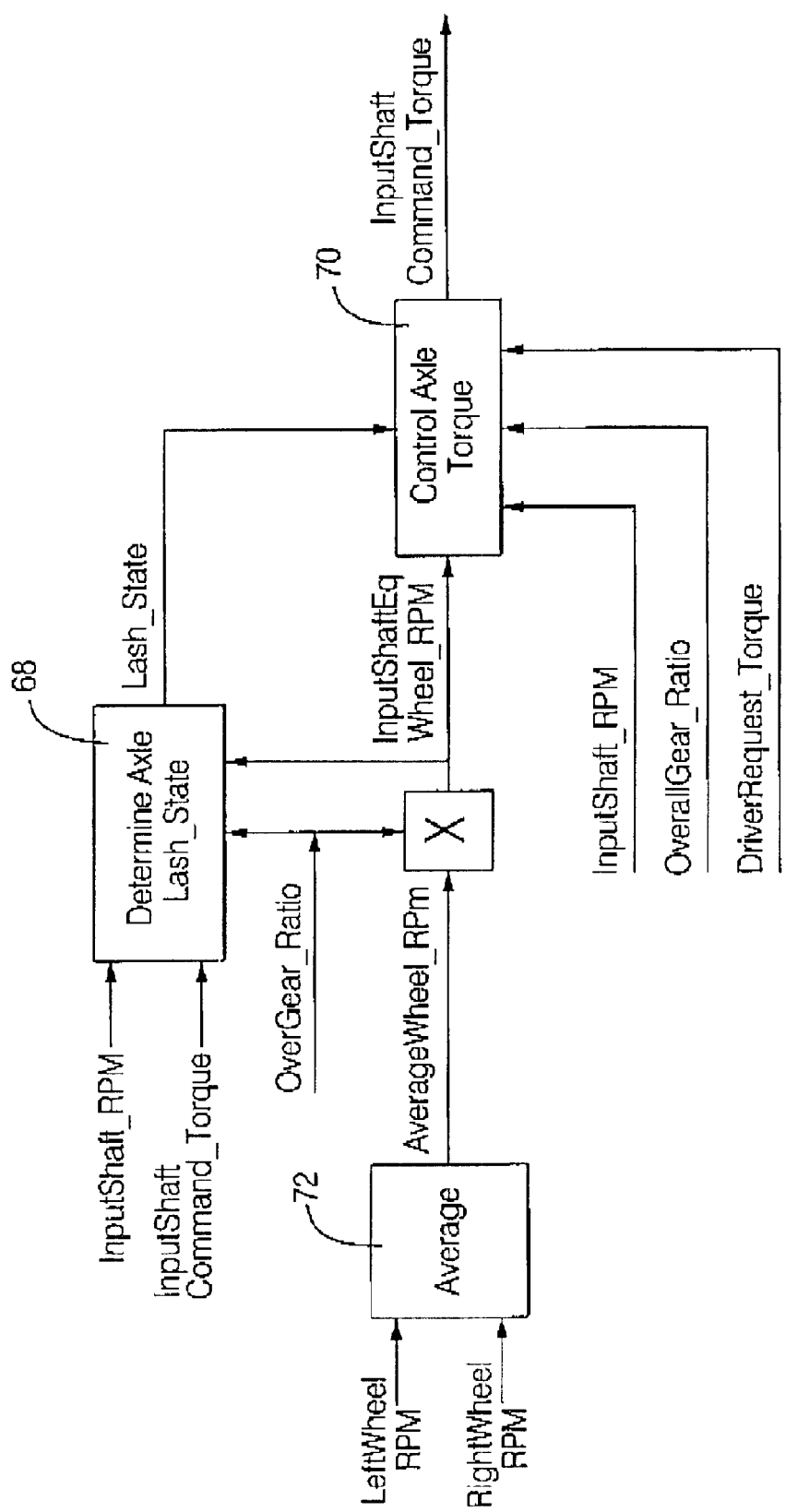
FIG. 10 is a diagram illustrating the clunk management algorithm.

FIG. 10 illustrates the clunk management strategy in accordance with a n exemplary embodiment of the present invention. The two major component s are the Determine Axle Lash_State algorithm 68 and the Control Axle Torque algorithm 70. First the LeftWheel_RPM and RightWheel_RPM are averaged at block 72 to form the AverageWheel_RPM. This multiplied by the OverallGear_Ratio of the transmission to form the InputShaftEqWheel_RPM.

The Determine Axle Lash_State algorithm uses this signal along with InputShaft_RPM, InputShaftCommand_Torque and OverallGear_Ratio to compute the signal Lash_State. The Control Axle Torque algorithm uses this signal along with InputShaftEqWheel_RPM, InputShaft_RPM, OverallGear_Ratio and DriverRequested_Torque to compute the InputShaftCommand_Torque signal.

Figure 11:
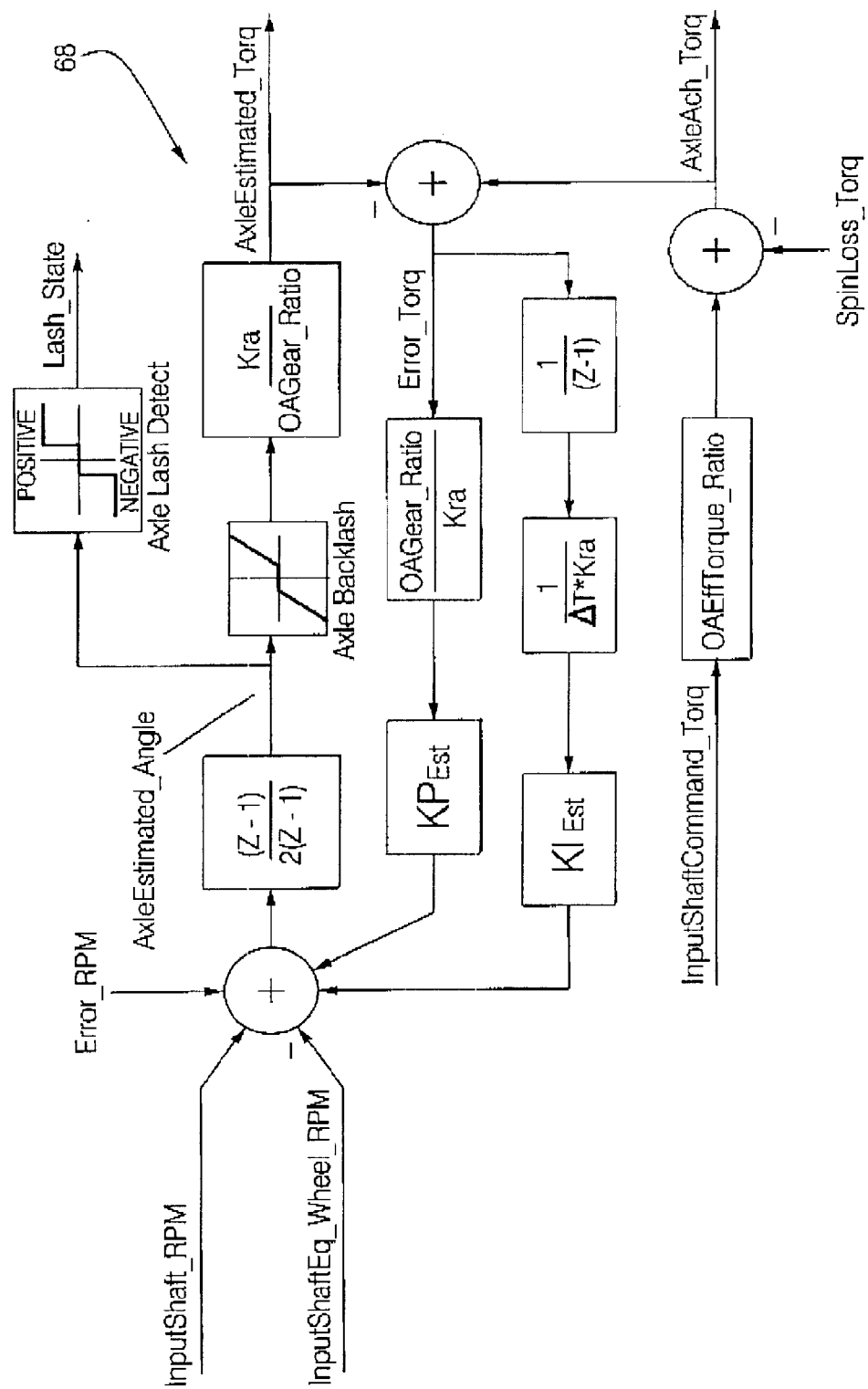
FIG. 11 is a diagram illustrating the determination of Axle Lash_State.

FIG. 11 shows the Determine Axle Lash_State algorithm. It is basically an estimator for the axle twist angle. The AxleEstimated_Angle is formed by integrating the difference InputShaft_RPM−InputShaftEqWheel_RPM. The term $(Z+1)/2(Z-1)$ represents the Input Output relationship: Output=Old_Output+1/2Input+1/2Old_Input. In order to prevent measurement errors, represented by the signal Error_RPM, from accumulating in the estimated angle a feedback correction must be added. To form this correction an Error_Torq signal is calculated, which is the difference AxleAch_Torq−AxleEstimated_Torq. AxleAch_Torq is the torque achieved on the axle based on knowledge of the InputShaftCommand_Torq, the OAEffTorque_Ratio and SpinLoss_Torq. OAEffTorque_Ratio is the overall gear ratio of the transmission times the torque transmission efficiency, which is a mapped function of speed and load. SpinLoss_Torq is the spin loss of the transmission, which is a mapped function of speed and temperature. AxleEstimated_Torque is the axle torque obtained with the AxleEstimated_Angle and the knowledge of the backlash, Kra axle stiffness and OAGear_Ratio. In short, the Error_Torq compares the torque obtained from using the estimated axle angle, which should be reliable during fast transients such as torque reversals, with the torque obtained using the input shaft torque, which should be reliable during longer steady state periods. The feedback then generates a slow correction by integrating the Error_Torq, scaling it by 1/KraDT and multiplying by the integral term gain Kiest. The variable DT is the sample interval or time between computation loops. A proportional path is added to insure stability by scaling Error_Torq by OAGear_Ratio/Kra and multiplying by Kpest. During steady periods the AxleEstimated_Torq will equal AxleAch_Torq. During transients InputShaft_RPM is the main determinant of AxleEstimated_Angle and AxleEstimated_Torq. Knowledge of the axle backlash is then applied to AxleEstimated_Angle to determine the Lash_State.

Figure 12:
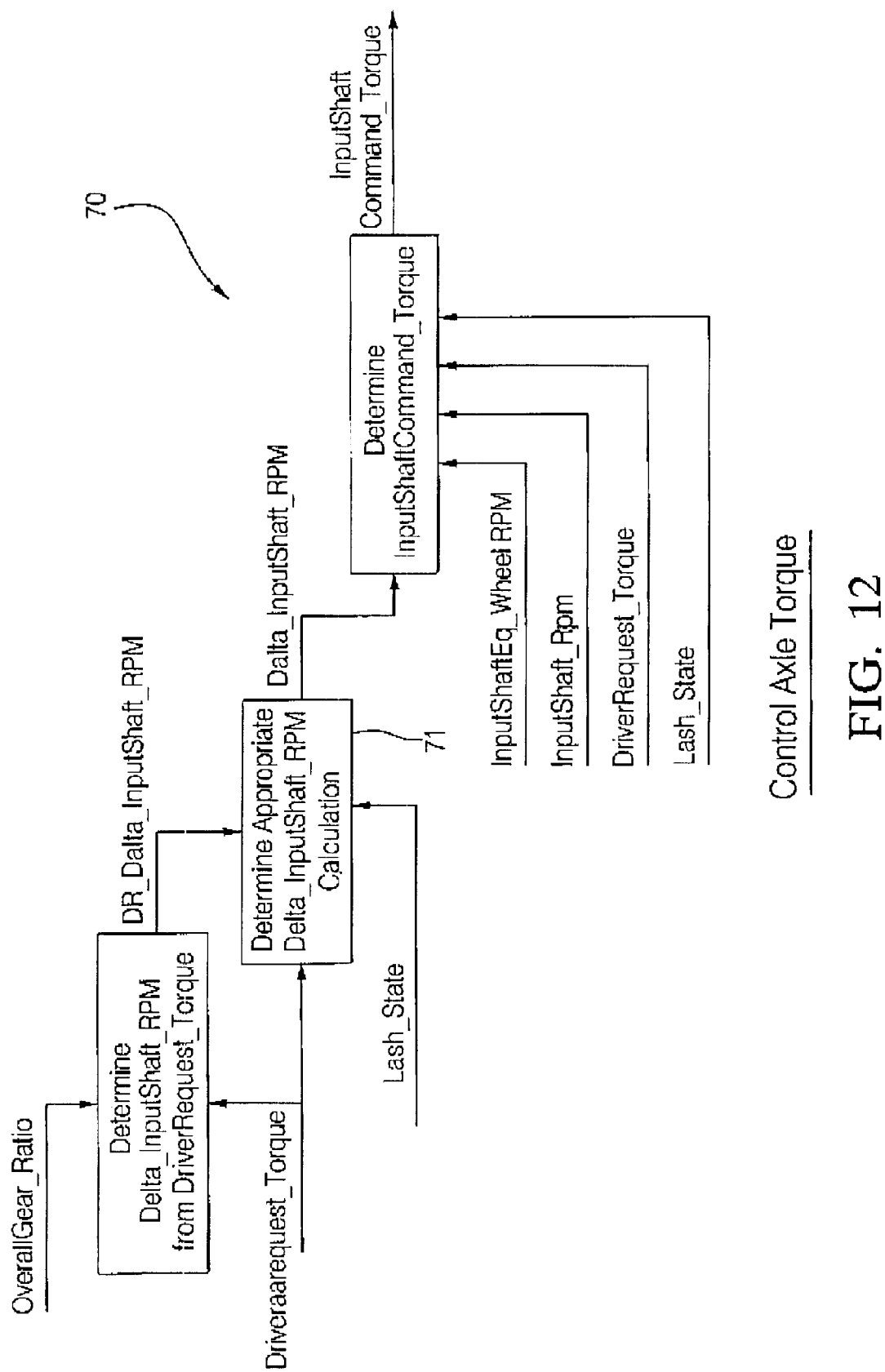
FIG. 12 is a diagram illustrating the calculation of control axle torque.

FIG. 12 illustrates the Control Axle Torque algorithm. First OverallGear_Ratio and DriverRequest_Torque are used to determine the DR_Delta_InputShaft_RPM. This process is essentially finding the required RPM difference from one end of the driveline to the other in order to follow the torque trajectory used outside of the lash zone. Second Delta_InputShaft_RPM is determined at algorithm 71 using DR_Delta_InputShaft_RPM, DriverRequested_Torque and Lash_State. This process chooses the RPM difference to use depending on whether it is inside or outside of the lash zone. Finally the InputShaftCommand_Torque is determined based on Delta_InputShaft_RPM, InputShaftEqWheel_RPM, InputShaft_RPM, DriverRequest_Torque and Lash_State. This is essentially determining a speed target for the input shaft and executing a PI control to achieve it.

Figure 13:
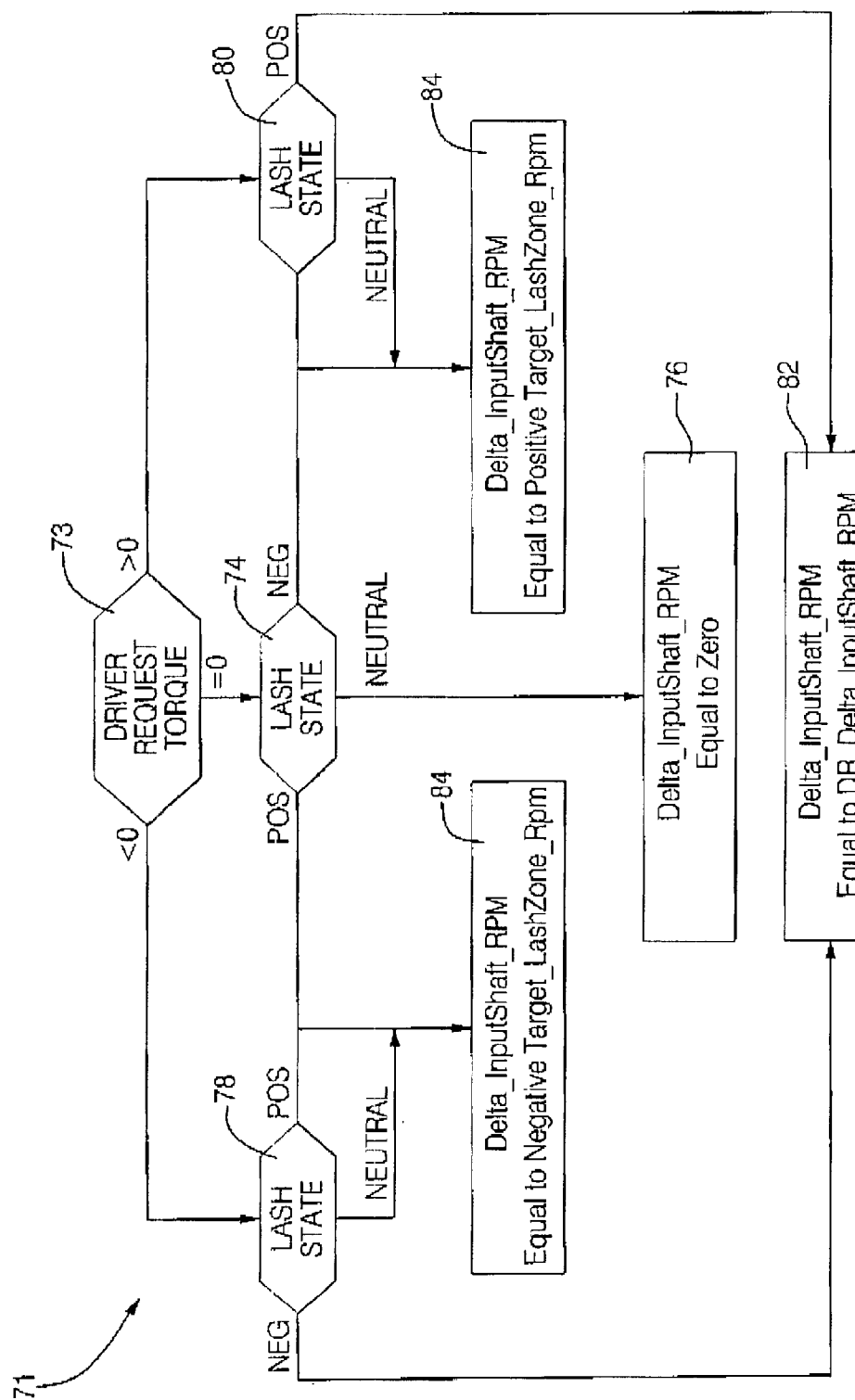
FIG. 13 is a flowchart illustrating the determination of an appropriate Delta_InputShaft_RPM calculation.

FIG. 13 illustrates portions of a command sequence of the algorithm 71 that determines whether to use a TargetLashZone_RPM or the DR_Delta_InputShaft_RPM, which follows the desired torque trajectory.

A decision node 73 determines if the DriverRequest_Torque is zero and a decision node 74 determines if the Lash_State is neutral then Delta_InputShaft_RPM will be zero (block 76).

If the Lash_State is positive and the DriverRequest Torque is positive or if Lash_State is negative (blocks 78 and 80) and the DriverRequest_Torque is negative, then the torque trajectory will be followed (block 82).

If the Lash_State is not the same as the DriverRequest_Torque then the TargetLashZone_RPM will be used untill it is the same (blocks 84).

Figure 14:
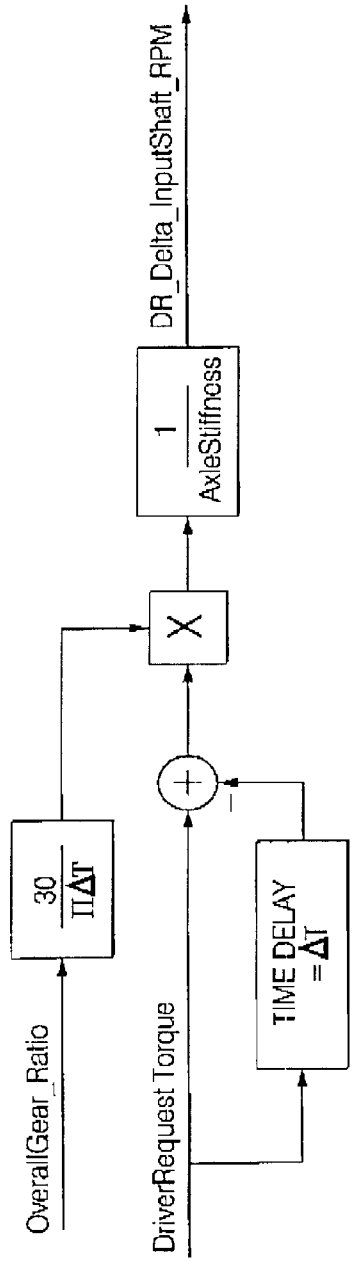
FIG. 14 is a diagram illustrating the determination of DR_Delta_InputShaft_RPM from DriverRequested_Torque.

FIG. 14 illustrates the calculation of DR_DeltaInputShaft_RPM.

DR_Delta_InputShaft_RPM is calculated to follow the torque trajectory. The DriverRequest_Torque is differentiated and scaled by OverallGear_Ratio and 1/AxleStiffness.

Figure 15:
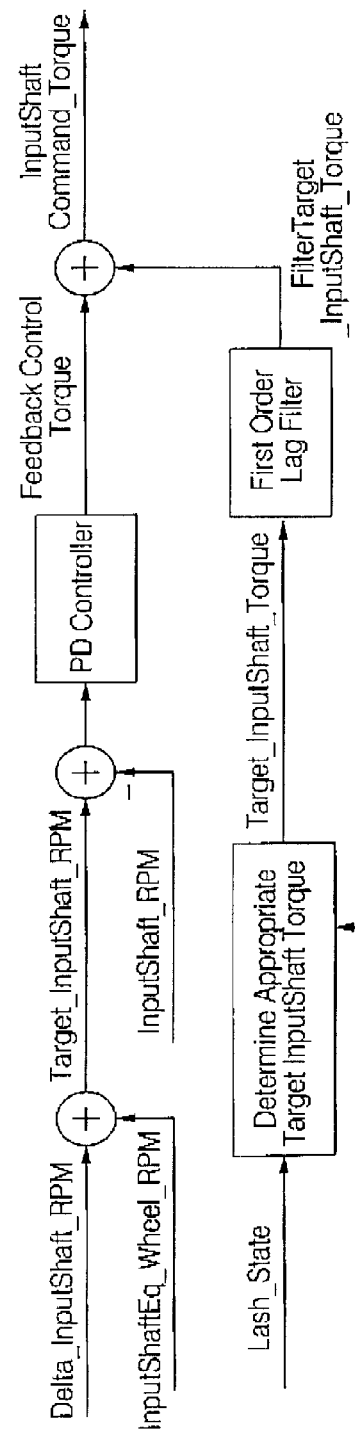
FIG. 15 is a diagram illustrating the determination of an InputShaftCommand_Torque.

FIG. 15 illustrates the calculation of Target_InputShaft_RPM.

Target_InputShaft_RPM is calculated by adding Delta_InputShaft_RPM to InputShaftEq_Wheel_RPM. The measured signal InputShaft_RPM is subtracted to form an error signal, which is then processed by a Proportional plus Derivative (PD) controller to generate a Feedback Control Torque. The Lash_State and DriverRequest_Torque are used to determine the appropriate Target_InputShaft_Torque. Essentially, when the lash is taken up, so that the Lash_State is the same direction as the DriverRequest_Torque, then the Target_InputShaft_Torque is determined proportional to the DriverRequest_Torque. Otherwise the Target_InputShaft_Torque is set to a small value untill the lash is taken up in the direction of the DriverRequest_Torque. The result is passed through a first order lag filter to produce the signal FilteredTarget_InputShaft_Torque, which is then added to the Feedback Control Torque to produce the control for the input shaft InputShaftCommand_Torque.

Figure 16:
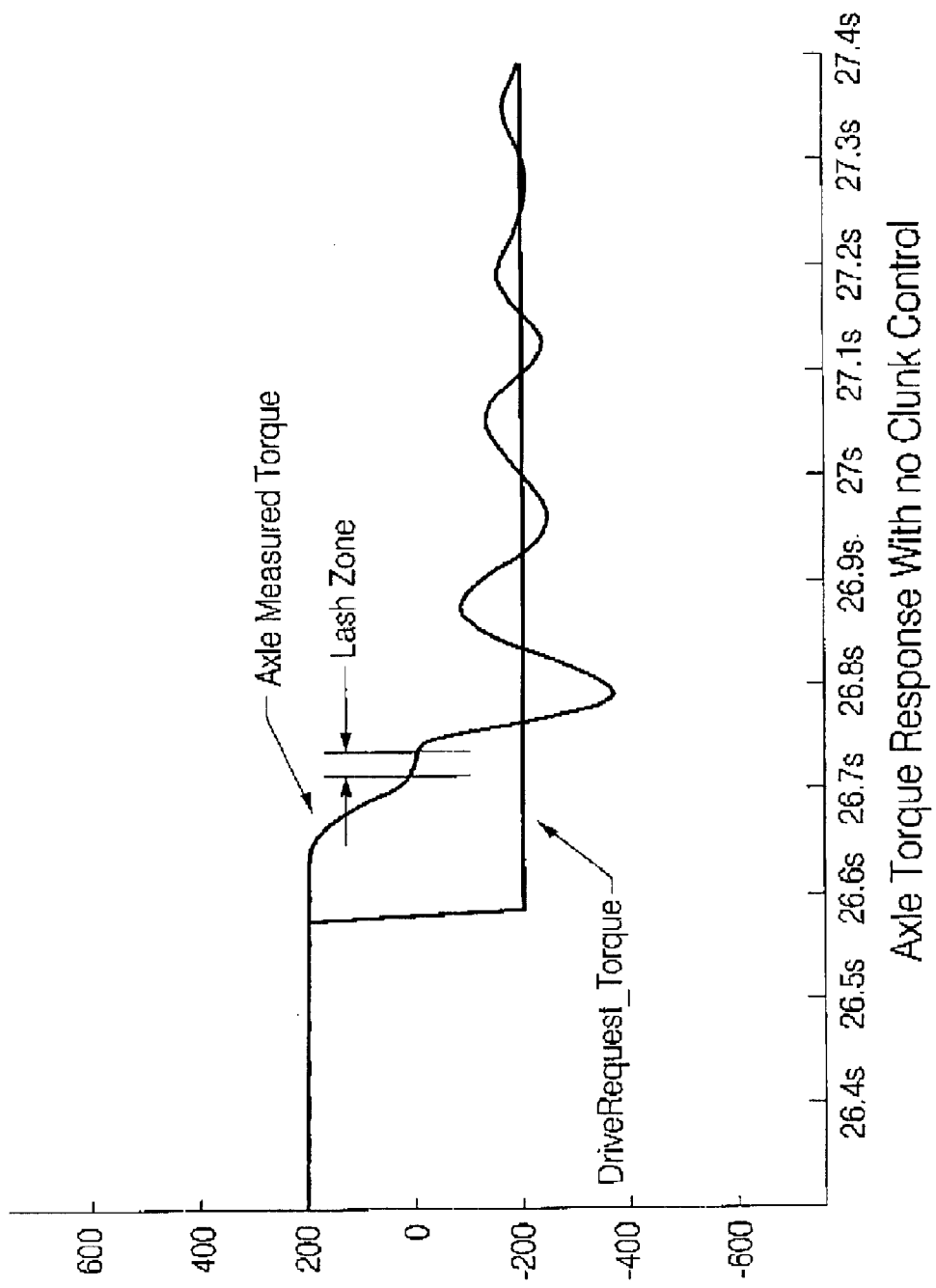
FIG. 16 is a graph illustrating an axle torque response with no clunk control.

Referring now to FIG. 16, this shows vehicle data that illustrates the need for clunk management. The DriverRequest_Torque changes from 200 Nm positive to 200 Nm negative torque. The Axle Measured Torque accelerates towards zero untill the axle unwinds and the lash zone is reached. When the lash is taken up in the negative direction an impact and oscillation results.

Figure 17:
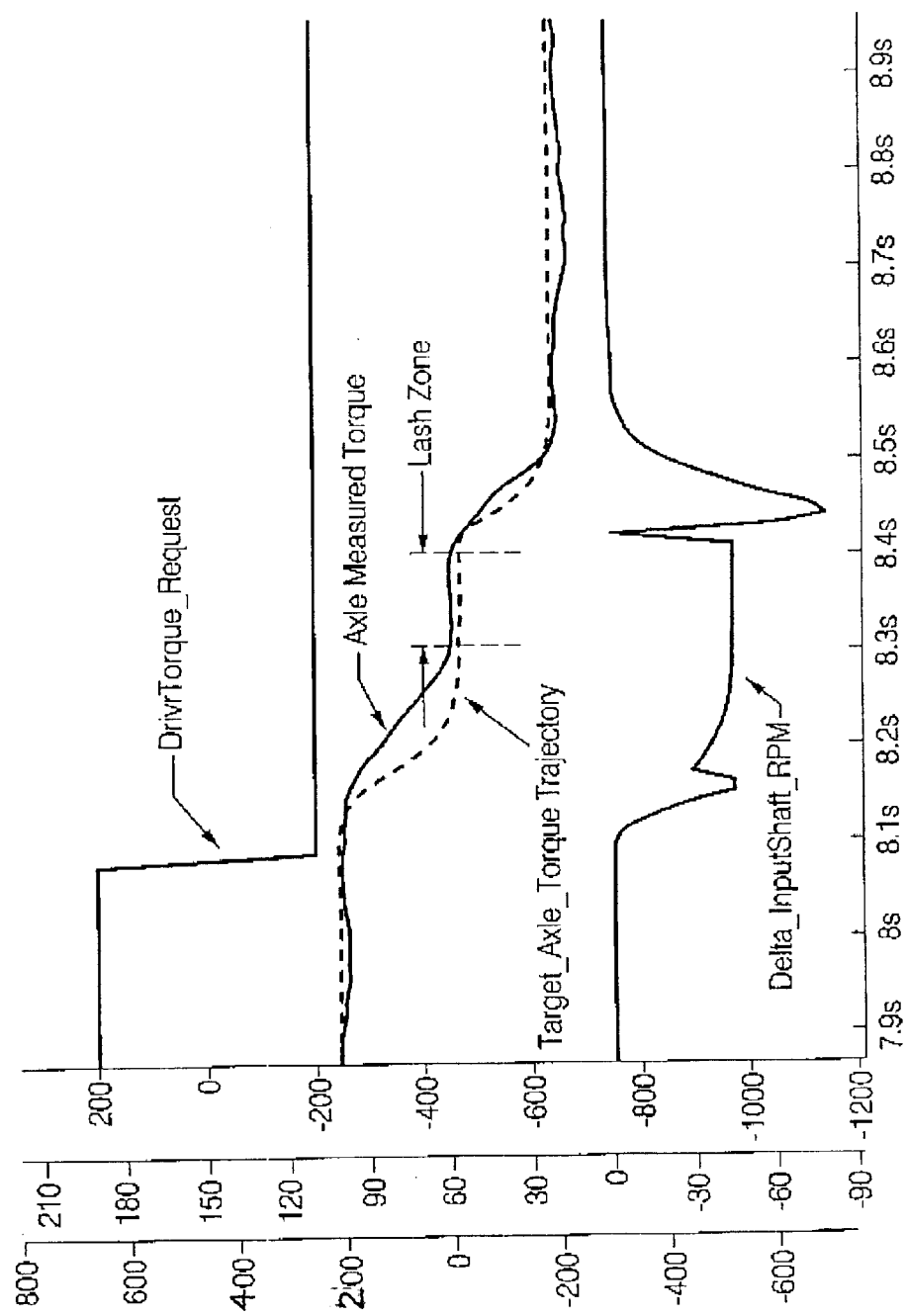
FIG. 17 is a graph illustrating an axle torque response with clunk control.

FIG. 17 shows vehicle data that illustrates the smooth performance of clunk management. The DriverRequest_Torque again changes from 200 Nm positive to 200 Nm negative torque. The InputShaft_RPM is controlled to reduce the Axle Measured Torque to zero in a controlled manner until the lash zone is reached. Then a fairly constant Delta_InputShaft_RPM of about −40 RPM is maintained until the lash is taken up. At this point the Delta_InputShaft_RPM assumes a profile that causes the Axle Measured Torque to track the Target_Axle_Torque Trajectory without impact or oscillation.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for controlling a torque in a driveline of a hybrid vehicle, comprising:
    a) controlling the torque applied to an input shaft of a transmission of said vehicle;
    b) differentiating a twist angle trajectory of said input shaft;
    c) adding said twist angle trajectory to a measured output shaft speed of said input shaft;
    d) scaling said twist angle trajectory and said measured output shaft speed;
    e) determining a desired input shaft speed trajectory;
    f) determining a speed target of said input shaft, said speed target causing a lash of said input shaft to be taken up with little impact; and
    g) applying the torque to said input shaft.

2. The method as in claim 1, wherein said torque is applied when said twist angle is in between a positive lash and a negative lash.

3. The method as in claim 1, wherein said twist angle is determined by an axle lash state algorithm and said torque is determined by a control axle torque algorithm.

4. The method as in claim 3, wherein said axle lash state algorithm receives an average wheel RPM input, an input shaft RPM input, an input shaft command torque input and an overall gear ratio input in order to determine said twist angle.

5. The method as in claim 3, wherein said control axle torque algorithm determines a torque trajectory used outside of a lash zone defined by positive lash and negative lash.

6. A method for controlling a transmission of a hybrid vehicle during the shifting of the gears of the transmission comprising:
    calculating a change in speed of an output shaft of the transmission due to a gear shifting request, the transmission receiving a driving force from a first drive and/or a second drive;
    calculating a phase compensated change in speed from said change in speed;
    calculating a damping torque from said phase compensated change in speed; and
    controlling one of said first or second drives to apply said damping torque to an input shaft of the transmission to provide a damping compensation during the shifting of gears.

7. The method as in claim 6, wherein calculating said change in speed of said output shaft comprises:
    measuring a first speed of a first road wheel and a second speed of a second road wheel;
    determining an average wheel speed from said first and second speeds; and
    calculating said change in speed from said average wheel speed and a drive speed of said first drive.

8. The method as in claim 6, wherein calculating said change in speed of said output shaft comprises using a filtered derivative of a drive speed of said first drive.

9. The method as in claim 8, wherein calculating said change in speed of said output shaft comprises:
    passing said drive speed through a first order lag filter to obtain a first value;

subtracting said first value from said drive speed to produce a first filtered derivative;

passing said first filtered derivative through a second first order lag filter to obtain a second value; and subtracting said second value from said first filtered derivative.

10. The method as in claim 6, wherein calculating said phase compensated change in speed comprises:

measuring a resonant frequency of the transmission to determine a frequency which needs to be damped; and selecting a plurality of coefficients so that said phase compensated change in speed is equal and opposite to said resonant frequency.

11. A method of controlling a transmission of a hybrid vehicle upon the application of a torque request on the transmission comprising:

determining a lash condition of an axel that is driven by the transmission as a result of the torque request, said lash condition being defined in a range by a first lash state and a second lash state;

applying a compensating torque to an input shaft of the transmission when said lash condition is in said first lash state; and controlling a speed of said input shaft to a target speed when said lash condition is in said second lash state.

12. The method as in claim 11, wherein said axel has an estimated twist angle that is outside a lash zone in said first lash state, said estimated twist angle being inside said lash zone in said second lash state.

13. The method as in claim 12, wherein said lash zone is defined by a positive twist angle and a negative twist angle.

14. The method as in claim 13, wherein the torque request is a regenerative braking request.

15. The method as in claim 11, wherein said target speed is sufficient to cause said input shaft to traverse said lash zone so as to mitigate impact among gears in the transmission.

16. The method as in claim 15, wherein said estimated twist angle is calculated by integrating a difference between a current speed of said input shaft and a resultant speed of said input shaft due to the torque request.

17. The method as in claim 16, further comprising correcting said estimated twist angle using a feedback correction input.

18. The method as in claim 17, wherein said feedback correction input compares a calculated torque from said estimated axle angle with an input shaft torque.

19. The method as in claim 13, further comprising:

determining said compensating torque and said target speed from a required speed difference between said input and said output shafts of the transmission due to the torque request and based on a selected speed difference between said input and said output shafts of the transmission based on said lash condition.

20. The method as in claim 19, wherein said selected speed difference is selected from the group consisting of:

zero if said twist angle is equal to zero and the torque request is zero;

a first speed if the torque request is greater than zero and said estimated twist angle is in a positive direction;

said first speed if the torque request is less than zero and said estimated twist angle is in a negative direction;

a second speed in a first direction if the torque request is less than zero and said estimated twist angle is in a positive direction; and said second speed in a second direction if the torque request is greater than zero and said estimated twist angle is in a negative direction.

21. The method as in claim 20, wherein determining said first speed comprises:

differentiating the torque request; and scaling the torque request by an overall gear ratio of the transmission and by an inverse of a stiffness of said axle.

22. The method as in claim 19, wherein said compensating torque is proportional to the driver requested torque when said estimated twist angle and the driver requested torque are in the same direction, and said compensating torque is set to a predetermined torque when said estimated twist angle and the driver requested torque are in opposite directions.

* * * * *